US008298634B2

(12) United States Patent
Schroeder et al.

(10) Patent No.: US 8,298,634 B2

(45) Date of Patent: Oct. 30, 2012

(54) FUSIBLE INKJET RECORDING MEDIA

(75) Inventors: Kurt M. Schroeder, Spencerport, NY (US); Lawrence P. DeMejo, Rochester, NY (US); Gregory E. Missell, Lima, NY (US)

(73) Assignee: Eastman Kodak Company, Rochester, NY (US)

( * ) Notice: Subject to any disclaimer, the term of this patent is extended or adjusted under 35 U.S.C. 154(b) by 896 days.

(21) Appl. No.: 12/241,355

(22) Filed: Sep. 30, 2008

(65) Prior Publication Data

US 2010/0080906 A1 Apr. 1, 2010

(51) Int. Cl.
*B41M 5/025* (2006.01)
*B41M 5/50* (2006.01)
*G01D 15/16* (2006.01)

(52) U.S. Cl. ............... 428/32.25; 428/32.17; 428/32.15; 428/32.34; 347/100; 525/407

(58) Field of Classification Search .................. 427/256; 525/407; 347/100; 428/32.34, 32.62, 32.15, 428/32.17, 32.25
See application file for complete search history.

(56) References Cited

U.S. PATENT DOCUMENTS

| | | | | |
|---|---|---|---|---|
| 4,785,313 | A | 11/1988 | Higuma et al. | |
| 4,832,984 | A | 5/1989 | Hasegawa et al. | |
| 6,140,390 | A | 10/2000 | Bugner et al. | |
| 6,695,447 | B1 | 2/2004 | Wexler | |
| 6,777,041 | B2 | 8/2004 | Yau et al. | |
| 6,789,891 | B2 | 9/2004 | Wang et al. | |
| 6,815,018 | B2 | 11/2004 | Wexler et al. | |
| 6,866,384 | B2 | 3/2005 | O'Connor et al. | |
| 7,198,363 | B2 | 4/2007 | Wexler | |
| 7,264,856 | B2 | 9/2007 | Wexler et al. | |
| 2003/0143344 | A1 | 7/2003 | Yau et al. | |
| 2005/0003112 | A1 * | 1/2005 | Chen | 428/32.11 |
| 2005/0287311 | A1 * | 12/2005 | Chen et al. | 428/32.34 |
| 2005/0287313 | A1 | 12/2005 | Chen et al. | |
| 2006/0045999 | A1 * | 3/2006 | Chen et al. | 428/32.24 |
| 2006/0078695 | A1 | 4/2006 | Sen et al. | |

FOREIGN PATENT DOCUMENTS

EP 0 227 245 A2 7/1987

OTHER PUBLICATIONS

Triton X-100 Surfactant, Chemical Description from Dow. 2011.*
Triton X-100 Surfactant Wetting Information from Dow. 2009.*
Pluronic 25R4 Technical Bulletin from BASF. 2004.*

* cited by examiner

*Primary Examiner* — Randy Gulakowski
*Assistant Examiner* — Kara Boyle
(74) *Attorney, Agent, or Firm* — Andrew J. Anderson

(57) ABSTRACT

An inkjet printing system contains an inkjet printer loaded with a recording element comprising a support and an ink receiving layer containing:
a) fusible polymeric particles; and
b) a water soluble block copolymer having ethylene oxide and propylene oxide segments, the copolymer exhibiting a Draves wetting coefficient, for a 0.1 wt % solution in water at 25° C., of not more than 360 seconds. An inkjet printing method and an inkjet recording medium are also contemplated.

18 Claims, 2 Drawing Sheets

FUSIBLE INKJET RECORDING MEDIA

FIELD OF THE INVENTION

The present invention relates to a porous inkjet recording media, and in particular to an inkjet recording element containing a porous layer of fusible polymeric particles.

BACKGROUND OF THE INVENTION

In a typical inkjet recording or printing system, ink droplets are ejected from a nozzle at high speed towards a recording element or medium to produce an image on the recording element. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol, or mixtures thereof.

Inkjet image recording elements have been designed in recent years to achieve photographic quality images when ink is applied to them from an inkjet printer. An inkjet recording element typically comprises a support having on at least one surface thereof at least one ink-receiving layer. The ink-receiving layer is typically either a porous layer that imbibes the ink via capillary action, or a polymer layer that swells to absorb the ink. Swellable hydrophilic polymer layers take an undesirably long time to dry compared to porous ink-receiving layers.

Porous ink-receiving layers are usually composed of inorganic or organic particles bonded together by a binder. The amount of particles in this type of coating is often far above the critical particle volume concentration (CPVC), which results in high porosity in the coating. During the inkjet printing process, ink droplets are rapidly absorbed into the coating through capillary action and the image is dry-to-touch right after it comes out of the printer. Although these porous recording elements are relatively fast drying, the resulting dye or pigment deposits that create the image are susceptible to physical damage both during and after printing of the images. This often requires a separate overcoat solution of a durability enhancing polymer or lamination of a polymer sheet over the resulting image in order to achieve acceptable post printing image durability.

Inkjet prints, prepared by printing onto inkjet recording elements, are also subject to environmental degradation. They are especially vulnerable to damage resulting from contact with water and atmospheric gases such as ozone. Ozone bleaches inkjet dyes resulting in loss of density. The damage resulting from the post imaging contact with water can take the form of water spots resulting from deglossing of the top coat, dye smearing due to unwanted dye diffusion, and even gross dissolution of the image recording layer. To overcome these deficiencies, inkjet prints are often laminated. However, lamination is expensive, as a film laminate is a separate roll of material which requires an adhesive layer prepared via an additional coating step. If the laminate is of the transfer type there is also added waste in the form of the exhausted coated support from which the laminate is transferred.

In another approach, fusible thermoplastic polymer particles can be coated as an uppermost porous layer of the recording element. Typically, the thermoplastic polymer particles are coated in a layer several microns thick and ink penetrates through the voids formed between the polymer particles when applied from an inkjet printer. After the ink is applied to the image recording element a fusing step, such as contact with a high temperature fusing roller, is used to heat the polymer particles above their glass transition temperature to form a continuous durable polymer film. This approach has the advantage that the majority of the colored image is covered or entrapped by the fused polymer layer. The resulting image is protected against physical abuse and the fused polymer layer can provide high density to the resulting photographic quality images. Designs for fusible recording elements are disclosed in U.S. Pat. Nos. 4,785,313; 4,832,984; 6,140,390; 6,695,447; 6,777,041; 6,789,891; 6,815,018; 6,866,384; 7,198,363; and 7,264,856.

Image recording elements designed with layers of fusible thermoplastic polymer particles are not without limitations. It is desirable that the fusible polymeric particle layer is of sufficient thickness to accommodate the entire fluid volume of ink that is applied from the printer. Typically, fusible thermoplastic particles have diameters ranging from about 0.1 to about 10 microns. These particle diameters are necessary so that the particles can be completely fused into a continuous layer after printing. In general, the fusible polymer particles are made of materials that are not easily wetted by the inks known in the art of aqueous inkjet printing. In the case of a thick layer of fusible polymer particles there can be adequate capacity to hold the printed ink; however, the ink must be able to penetrate through the voids between the polymer particles instead of coalescing on the surface of the recording element. This is especially problematic when printing pigment-based inks onto the fusible polymer particle layer since the discrete pigment particles can plug the voids between the polymer particles and slow down the flux of ink through the fusible layer.

Fusible particle layers also have the problem of bleeding between inks of different colors into one another which can occur during the printing operation. This is especially true at high ink laydowns where the flux of ink into the porous fusible polymer particle layer is low. It is also desirable that the majority of the ink penetrates through the entire fusible polymer particle layer. This prevents components present in the ink from interfering with the fusing step and allows for high density and high gloss in the imaged areas of the print.

Fusible image recording elements can also show limitations in performance after fusing of the thermoplastic polymer particles. Incomplete fusing of the thermoplastic particles results in weak polymer films that can crack during bending of the recorded image element. Cracking of the polymer film is highly undesirable since the resulting imperfections in the polymer layer can allow destructive chemicals, such as ozone, to chemically attack the colorants, or liquids to stain the printed image. Incomplete fusing of the layer can also result in deglossing artifacts. In some cases, fusible recording elements can show a relatively high gloss immediately after fusing, but lose some amount of gloss over a period of time after fusing. This deglossing artifact can be rationalized as incompletely fused beads that tend to retain their original shape thereby leading to irregularities in the polymer film.

There remains a need to provide image recording elements containing a porous layer of fusible polymer particles that can accept large amounts of ink in a rapid manner without coalescing or bleeding and which show excellent post fusing characteristics such as stain resistance, deglossing resistance and crack resistance that provide high quality durable photographic images.

SUMMARY OF THE INVENTION

The present invention is directed to overcoming one or more of the problems set forth above. This is accomplished by an inkjet printing system that contains an inkjet printer loaded with a recording element comprising a support and an ink receiving layer containing:

a) fusible polymeric particles; and b) a water soluble block copolymer having ethylene oxide and propylene oxide segments, the copolymer exhibiting a Draves wetting coefficient, for a 0.1 wt % solution in water at 25° C., of not more than 360 seconds. An inkjet printing method and an inkjet recording medium are also contemplated.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
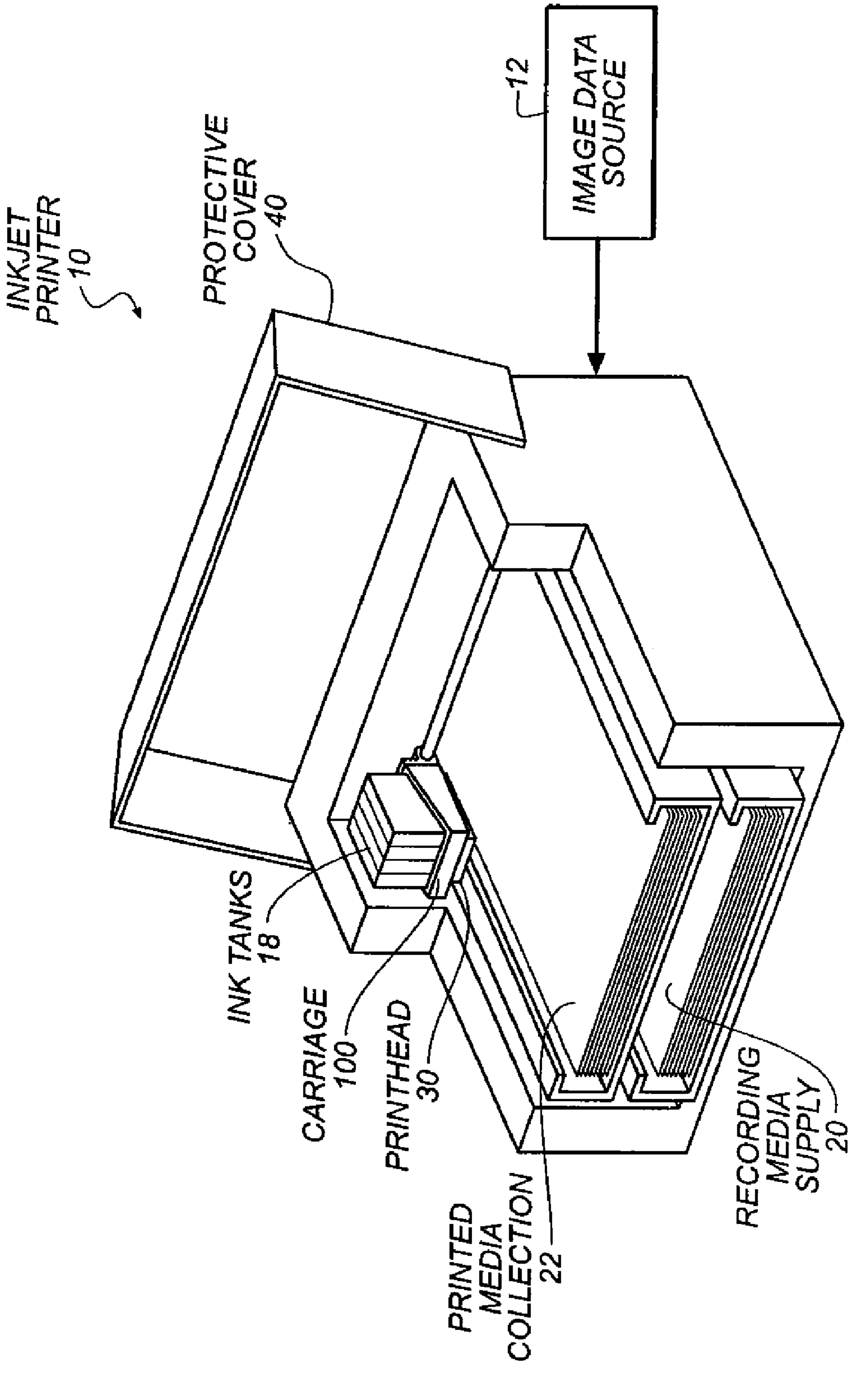
FIG. 1 is a schematic view of an inkjet printing system of the invention.

The inkjet recording element useful in the present invention comprises a support and at least one layer of fusible polymeric particles. The support used in the inkjet recording element of the invention may be opaque, translucent, or transparent There may be used, for example, plain papers, resin-coated papers, various plastics including a polyester resin such as poly(ethylene terephthalate), poly(ethylene naphthalate) and poly(ester diacetate), a polycarbonate resin, a fluorine resin such as poly(tetra-fluoro ethylene), metal foil, vinyl, fabric, laminated or coextruded supports, various glass materials, and the like. In a desirable embodiment, the support is a resin-coated paper. The thickness of the support employed in the invention can be from about 12 to about 500 μm, desirably from about 75 to about 300 μm. If desired, in order to improve the adhesion of any layers adjacent to the support, the surface of the support may be corona-discharge-treated prior to application of any additional layers. The backside of the support (opposite to the fusible polymer particle layer) can also comprise an anti-curl and/or water repellency layer.

The inkjet recording element useful in the invention comprises at least one layer of fusible polymer particles. Desirably, the outermost layer of the recording element comprises fusible polymer particles. "Fusible polymer particle" is defined herein as any polymer capable of being converted from discrete particles into a substantially continuous layer through the application of heat and/or pressure. The fusible polymeric particles may be formed from a condensation polymer, a styrenic polymer, a vinyl polymer, an ethylene-vinyl chloride copolymer, a polyacrylate, poly(vinyl acetate), poly (vinylidene chloride), or a vinyl acetate-vinyl chloride copolymer. In one useful embodiment, the fusible polymer particles are condensation polymers that may be a polyester or polyurethane. In another desirable embodiment of the invention, the fusible, polymeric particles comprise a cellulose acetate ester. In yet another embodiment, the glass transition temperature of the fusible polymer particles is greater than or equal to 20° C., desirably greater than 50° C., and in one useful embodiment greater than 70° C.

The fusible polymer particles may also comprise functional groups that are reactive with one another during the fusing step to crosslink the continuous fused polymer layer. Reactive fusible polymer particles useful in the fusible layer of the present invention are described in US Patent Publication Numbers 2006/0205870, 2006/0204686, 2006/0204684, 2006/0204685, 2006/0003115, and 2006/0003112.

The weight average diameter of the fusible polymeric particles useful in the present invention is generally at least 0.05, desirably at least 0.1, and typically at least 0.2 microns, and is generally not more than 5, desirably not more than 2, and typically not more than 1 micron. It is also desirable that the fusible polymeric particles are relatively mono-disperse in size as this leads to improved fusing of the particles into a continuous layer. The mono-dispersity index of the fusible polymer particles is typically less than 1.5, desirably less than 1.3, and in one particularly useful embodiment less than 1.1. The shape of the fusible polymeric particles is not particularly limiting, but desirably the polymer particles are substantially spherical in shape and have useful porosity.

The layer comprising fusible polymeric particles also comprises at least one ethylene oxide-propylene oxide copolymer having a Draves wetting coefficient for a 0.1 wt % solution in water of not more than 360 seconds. The Draves wetting coefficient of the copolymer wetting agent is desirably less than 200 and in one particularly useful embodiment less than 100. The Draves Wetting Test for a wetting agent in water is described in the ASTM D2281-68(1997), "Standard Test Method for Evaluation of Wetting Agents by the Skein Test." Briefly stated, the Draves Wetting Test measures the time needed for a cotton skein to be wetted in a solution of a wetting agent at a given concentration and at a temperature of 25° C. Literature values for the Draves wetting numbers of common wetting agents are quoted by the manufactures of many commercially available surfactants and wetting agents.

Useful ethylene oxide-propylene oxide copolymers having a Draves wetting coefficient of not more than 360 seconds are selected from the following structures I-IV:

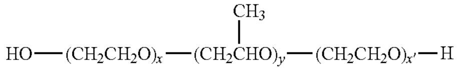
I)

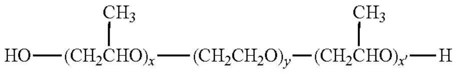
II)

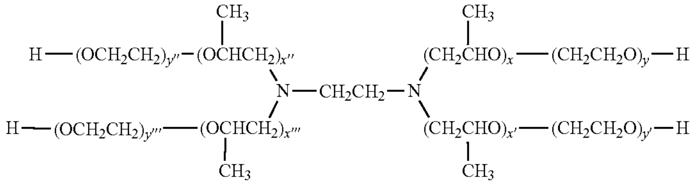
III)

-continued

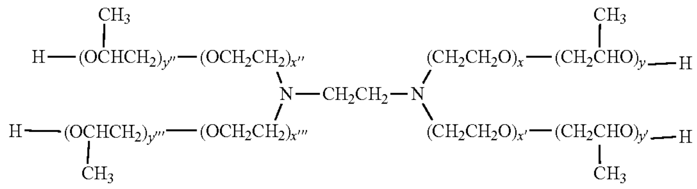

IV)

Useful amounts of total x-type (ethoxy) and total y-type (propoxy) in the block polymer provide ethoxy of 5, desirably 10, and suitably at least 20 wt % and up to 40 wt %.

Useful commercially available ethylene oxide-propylene oxide copolymers having a Draves wetting coefficient of not more than 360 seconds include some of those materials sold as the PLURONIC®, PLURONIC® R, and TETRONIC® wetting agents available from BASF. Examples of compounds useful as ethylene oxide-propylene oxide block copolymers useful in the present invention are shown in Table 1 along with their respective literature values for the Draves wetting coefficient (in seconds) of a 0.1% solution in water at 25° C. Literature values for the Hydrophilic-Lipophilic Balance (HLB) and average molecular weight of the wetting agent are also provided. Methods of determining the value of this parameter are described in "Polymeric Surfactants," by J. Pirma, Surfactant Science Series, V. 42, Pg. 221. The molecular weight of the ethylene oxide-propylene oxide block copolymers useful in the present invention is generally at least 1,000, and suitably at least 4000, while the upper limit is generally 30,000, desirably 15,000, and in one particularly useful embodiment 10,000. For structures (I) and (II), the weight of propoxy is typically 1500, desirably at least 1700 and up to 3500, desirably up to 3100. For structures (III) and (IV), the weight of propoxy is typically 1000-7000, desirably from 2000-5000. The HLB value for the ethylene oxide-propylene oxide block copolymers of the present invention are typically not limiting. Desirably, the HLB is between 7 and 24. Water-soluble ethylene oxide-propylene oxide block copolymers of the present invention typically have HLB values between 12 and 24 and desirably from 12 to 18.

TABLE 1

Typical Ethylene oxide-Propylene oxide Block Copolymers Useful in the Present invention.

| ID | Compound Name | Draves Coefficient | HLB | Molecular weight-Daltons |
|---|---|---|---|---|
| I-1 | PLURONIC ® P103 | 17 | 7-12 | 4950 |
| I-2 | PLURONIC ® L72 | 30 | 1-7 | 2750 |
| I-3 | PLURONIC ® 17R1 | 70 | 1-7 | 1900 |
| I-4 | PLURONIC ® 31R1 | 12 | 1-7 | 3250 |
| I-5 | TETRONIC ® 904 | 88 | 12-18 | 6700 |
| I-6 | TETRONIC ® 1104 | 37 | 12-18 | 8300 |
| I-7 | TETRONIC ® 1107 | 185 | 18-23 | 15000 |
| I-8 | TETRONIC ® 1304 | 48 | 12-18 | 10500 |
| I-9 | TETRONIC ® 90R4 | 40 | 1-7 | 7240 |

The amount of the ethylene oxide-propylene oxide block copolymer useful in the fusible polymer particle layer may be expressed as a percentage of the polymer particles by weight. Typically, the ethylene oxide-propylene oxide copolymer is present at between 0.5 to 10% by weight of the fusible polymer particles, desirably from 1 to 10% and in one particularly useful embodiment between 2 to 6%.

Additional components can be present in the fusible block polymer particle layer of the image element of the invention. A binder can be present to aid in the coating of the layer comprising fusible polymer particles and to maintain integrity of the polymer particle layer prior to and after printing of the ink droplets. Any suitable binder can be used such as, for example, polymers and copolymers of polyvinyl alcohol, polyvinyl pyrrolidinone, methyl cellulose acetate, polyester, polyurethane, styrenic, acrylate, and styrene-butadiene polymers. Among these binders, styrene-butadiene latex polymers are particularly useful as they are the least sensitive to components in the ink compositions that may affect post-fusing properties. Binders can be present from 0 to 10% by weight based on the total components in the fusible polymer particle layer, desirably from 1 to 10%, and in one particularly useful embodiment from 2 to 5%.

In order to impart mechanical durability to the ink carrier-liquid receptive layer, crosslinkers which act upon the binder discussed above may be added in small quantities. Such an additive improves the cohesive strength of the layer. Crosslinkers such as carbodiimides, polyfunctional aziridines, aldehydes, isocyanates, epoxides, polyvalent metal cations, vinyl sulfones, pyridinium, pyridylium dication ether, methoxyalkyl melamines, triazines, dioxane derivatives, chrom alum, zirconium sulfate, and the like may be used. Preferably, the crosslinker is an aldehyde, an acetal, or a ketal, such as 2,3-dihydroxy-1,4-dioxane.

Other components can be present in the fusible polymer particle layer in order to achieve desirable image quality and for ease of manufacturing including, for example, biocides, pH adjusting agents, rheology modifiers, surface tension adjusting agents, mordants, and inorganic or organic filler particles.

Since the inkjet recording element may come in contact with other image recording articles or the drive or transport mechanisms of image recording devices, additives such as surfactants, lubricants, and matte particles may be added to the element to the extent that they do not degrade the properties of interest.

The dry coated thickness of the fusible polymer particle layer is typically from 1 micron to 50 microns, desirably from 5 microns to 20 microns, and in one particularly useful embodiment from 5 microns to 10 microns. Fusible polymer particle layers thicker than 50 microns can be contemplated, but generally layers of this thickness are difficult to fuse to a continuous polymer film. Fusible polymer particle layers much below 1 micron can be deficient in their ability to protect the printed image from ozone attack and can be insufficient for physical durability.

After printing on the element, the fusible, porous ink-receiving layer is heat and/or pressure fused to form a substantially continuous overcoat layer on the surface. Additional optional fusible layers are also fused at the same time. Upon fusing, these layers are rendered non-light scattering. Fusing may be accomplished in any manner that is effective for the intended purpose. A description of a fusing method employing a fusing belt can be found in U.S. Pat. No. 5,258,256, and a description of a fusing method employing a fusing roller can be found in U.S. Pat. No. 4,913,991, the disclosures of which are hereby incorporated by reference.

In a preferred embodiment, fusing is accomplished by contacting the surface of the element with a heat-fusing member, such as a fusing roller or fusing belt. Thus, for example, fusing can be accomplished by passing the element through a pair of heated rollers, heated to a temperature of about 60° C. to about 160° C., using a pressure of 5 to about 15 MPa at a transport rate of about 0.005 m/sec to about 0.5 m/sec.

The inkjet imaging element of the present invention may comprise one or more additional layers beyond that of the fusible polymer particle layer. In one embodiment, a porous layer can be disposed between the fusible polymer particle layer and the support. This lower porous layer can be designed to rapidly remove liquids from the printed ink droplets while allowing colorants, such as dyes and pigments, to be retained within or at the intersection of the fusible layer and lower layer. The lower layer can comprise inorganic particles and binders commonly used in the art of inkjet recording elements to provide a porous layer structure. In one useful embodiment the inorganic particles of the lower layer are selected from alumina, silica, calcium carbonate, clays, and calcium metasilicate. Examples of alumina include fumed alumina and hydrated alumina, for example boehmite or pseudo-boehmite. Examples of silica include fumed silica, colloidal silica, and silica gel. Calcium carbonate may be precipitated or ground. Mixtures of these particles are also contemplated. In another useful embodiment the sump layer can comprise fusible polymer particles, such as, for example, hollow polymer beads. Useful dry coated thicknesses of the sump layer can be from 5 to 50 microns and desirably from 5 to 25 microns.

In another useful embodiment, the inkjet imaging element can comprise a plurality of fusible layers. In one such embodiment a layer of fusible polymer particles can contain a mordant and a second outermost fusible polymer particle layer can be present farthest from the support, such that the fusible layer containing mordant is disposed between the support and the outermost fusible layer. In one useful embodiment, the mordant has a cationic charge. Examples of such mordants include cationic lattices such as disclosed in U.S. Pat. No. 6,297,296 and references cited therein, cationic polymers such as disclosed in U.S. Pat. No. 5,342,688, and multivalent ions as disclosed in U.S. Pat. No. 5,916,673. Examples of these mordants include polymeric quartenary ammonium compounds, or basic polymers, such as poly(dimethylaminoethyl)-methacrylate, polyalkylenepolyamines, and products of the condensation thereof with dicyanodiamide, amine-epichlorohydrin polycondensates. Further, lecithins and phospholipid compounds can also be used. Specific examples of such mordants include the following: vinylbenzyl trimethyl ammonium chloride/ethylene glycol dimethacrylate; poly(diallyl dimethyl ammonium chloride); poly(2-N,N,N-trimethylammonium)ethyl methacrylate methosulfate; poly(3-N,N,N-trimethylammonium)propyl methacrylate chloride; a copolymer of vinylpyrrolidinone and vinyl(N-methylimidazolium chloride; and hydroxyethylcellulose derivatized with 3-N,N,N-triiethylammonium)propyl chloride. In a preferred embodiment, the cationic mordant is a quaternary ammonium compound.

This arrangement is particularly beneficial for the printing of dye-based inks since the intermediate fusible layer containing mordant can trap the dye during the printing operation. Upon fusing, the outermost fusible polymer particle layer provides a continuous polymer over the entire dye-based image. In the case of multiple fusible layers, the ethylene oxide-propylene oxide copolymer is present in at least the outmost layer and desirably in both fusible layers.

The layers described above may be coated by conventional coating means onto a support material commonly used in this art. Coating methods may include, but are not limited to, wound wire rod coating, air-knife coating, slot coating, slide hopper coating, gravure, curtain coating, and the like. Some of these methods allow for simultaneous coatings of more than one layer, which is preferred from a manufacturing economic perspective.

Inkjet printing systems useful in the invention comprise a printer, at least one ink, and an image recording element, typically a sheet (herein also referred to as "media" or "medium"), suitable for receiving ink from an inkjet printer. Inkjet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand inkjet, individual ink droplets are projected as needed onto the image-recording element to form the desired printed image. Common methods of controlling the projection of ink droplets in drop-on-demand printing include piezoelectric transducers, thermal bubble formation, or an actuator that is made to move.

Drop-on-demand (DOD) liquid emission devices have been known as ink printing devices in inkjet printing systems for many years. Early devices were based on piezoelectric actuators such as are disclosed U.S. Pat. Nos. 3,946,398 and 3,747,120. A currently popular form of inkjet printing, thermal inkjet (or "thermal bubble jet"), uses electrically resistive heaters to generate vapor bubbles which cause drop emission, as is discussed in U.S. Pat. No. 4,296,421. In another process, known as continuous inkjet, a continuous stream of droplets is generated, a portion of which are deflected in an image-wise manner onto the surface of the image-recording element, while un-imaged droplets are caught and returned to an ink sump. Continuous inkjet printers are disclosed in U.S. Pat. Nos. 6,588,888; 6,554,410; 6,682,182; 6,793,328; 6,866,370; 6,575,566; and 6,517,197.

The ink compositions known in the art of inkjet printing may be aqueous- or solvent-based, and in a liquid, solid, or gel state at room temperature and pressure. Aqueous-based ink compositions are preferred because they are more environmentally friendly as compared to solvent-based inks, plus most printheads are designed for use with aqueous-based inks.

The ink composition may be colored with pigments, dyes, polymeric dyes, loaded-dye/latex particles, or any other types of colorants, or combinations thereof. Pigment-based ink compositions are used because such inks render printed images giving comparable optical densities with better resistance to light and ozone as compared to printed images made from other types of colorants. The colorant in the ink composition may be yellow, magenta, cyan, black, gray, red, violet, blue, green, orange, brown, etc.

A challenge for inkjet printing is the stability and durability of the image created on the various types of inkjet receivers. It is generally known that inks employing pigments as ink colorants provide superior image stability relative to dye based inks for light fade and fade due to environmental pollutants especially when printed on microporous photoglossy receivers. For good physical durability (for example, abrasion resistance) pigment based inks can be improved by the addition of a binder polymer to the ink composition.

Ink compositions useful in the present invention are aqueous-based. Aqueous-based is defined herein to mean the majority of the liquid components in the ink composition are water, preferably greater than 50% water, and more preferably greater than 60% water.

The water compositions useful in the invention may also include humectants and/or co-solvents in order to prevent the ink composition from drying out or crusting in the nozzles of the printhead, aid solubility of the components in the ink composition, or facilitate penetration of the ink composition into the image-recording element after printing. Representative examples of humectants and co-solvents used in aqueous-based ink compositions include: (1) alcohols such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols such as ethylene glycol, diethylene glycol, triethylene glycol, tetraethylene glycol, propylene glycol, polyethylene glycol, polypropylene glycol, 1,2-propane diol, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol, glycerol, 1,2,6-hexanetriol, 2-ethyl-2-hydroxymethyl-propane diol, saccharides and sugar alcohols, and thioglycol; (3) lower mono- and di-alkyl ethers derived from the polyhydric alcohols such as, ethylene glycol monomethyl ether, ethylene glycol monobutyl ether, ethylene glycol monoethyl ether acetate, diethylene glycol monomethyl ether, and diethylene glycol monobutyl ether acetate; (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanol, dimethyl sulfoxide, and tetramethylene sulfone.

The ink compositions useful in the invention are pigment-based because such inks render printed images having higher optical densities and better resistance to light and ozone as compared to printed images made from other types of colorants. Pigments that may be used in the inks useful in the invention include those disclosed in, for example, U.S. Pat. Nos. 5,026,427; 5,085,698; 5,141,556; 5,160,370; and 5,169,436. The exact choice of pigments will depend upon the specific application and performance requirements such as color reproduction and image stability.

Pigments suitable for use in the invention include, but are not limited to, azo pigments, monoazo pigments, diazo pigments, azo pigment lakes, b-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; and mixtures thereof.

Self-dispersing pigments that are dispersible without the use of a dispersant or surfactant may also be useful in the invention. Pigments of this type are those that have been subjected to a surface treatment such as oxidation/reduction, acid/base treatment, or functionalization through coupling chemistry, such that a separate dispersant is not necessary. The surface treatment can render the surface of the pigment with anionic, cationic, or non-ionic groups. See for example, U.S. Pat. Nos. 6,494,943 and 5,837,045. Examples of self-dispersing type pigments include CAB-O-JET® 200 and CAB-O-JET® 300 (Cabot Specialty Chemicals, Inc.) and BONJET® CW-1, CW-2, and CW-3 (Orient Chemical Industries, Ltd.). In particular, a self-dispersing carbon black pigment ink may be employed in the ink set useful in the invention, wherein ink comprises a water soluble polymer containing acid groups neutralized by an inorganic base, and the carbon black pigment comprises greater than 11 weight % volatile surface functional groups as disclosed in commonly assigned, copending U.S. application Ser. No. 12/029,909, the disclosure of which is incorporated by reference herein.

Pigment-based ink compositions useful in the invention may be prepared by any method known in the art of inkjet printing. Useful methods commonly involve two steps: (a) a dispersing or milling step to break up the pigments to primary particles, where primary particle is defined as the smallest identifiable subdivision in a particulate system, and (b) a dilution step in which the pigment dispersion from step (a) is diluted with the remaining ink components to give a working strength ink.

The milling step (a) is carried out using any type of grinding mill such as a media mill, ball mill, two-roll mill, three-roll mill, bead mill, and air-jet mill; an attritor; or a liquid interaction chamber. In the milling step (a), pigments are optionally suspended in a medium that is typically the same as or similar to the medium used to dilute the pigment dispersion in step (b). Inert milling media are optionally present in the milling step (a) in order to facilitate break up of the pigments to primary particles. Inert milling media include such materials as polymeric beads, glasses, ceramics, metals, and plastics as described, for example, in U.S. Pat. No. 5,891,231. Milling media are removed from either the pigment dispersion obtained in step (a) or from the ink composition obtained in step (b).

A dispersant is optionally present in the milling step (a) in order to facilitate break up of the pigments into primary particles. For the pigment dispersion obtained in step (a) or the ink composition obtained in step (b), a dispersant is optionally present in order to maintain particle stability and prevent settling. Dispersants suitable for use in the invention include, but are not limited to, those commonly used in the art of inkjet printing. For aqueous pigment-based ink compositions, useful dispersants include anionic, cationic, or nonionic surfactants such as sodium dodecylsulfate, or potassium or sodium oleylmethyltaurate as described in, for example, U.S. Pat. Nos. 5,679,138; 5,651,813; or 5,985,017.

Polymeric dispersants are also known and useful in aqueous pigment-based ink compositions. Polymeric dispersants may be added to the pigment dispersion prior to, or during the milling step (a), and include polymers such as homopolymers and copolymers; anionic, cationic, or nonionic polymers; or random, block, branched, or graft polymers. Polymeric dispersants useful in the milling operation include random and block copolymers having hydrophilic and hydrophobic portions; see for example U.S. Pat. Nos. 4,597,794; 5,085,698; 5,519,085; 5,272,201; 5,172,133; or 6,043,297; and graft copolymers; see for example, U.S. Pat. Nos. 5,231,131; 6,087,416; 5,719,204; or 5,714,538.

Composite colorant particles having a colorant phase and a polymer phase are also useful in aqueous pigment-based inks useful in the invention. Composite colorant particles are formed by polymerizing monomers in the presence of pigments; see for example, US Patent Publication Numbers 2003/0199614, 2003/0203988, or 2004/0127639. Microencapsulated-type pigment particles are also useful and consist of pigment particles coated with a resin film; see for example U.S. Pat. No. 6,074,467.

The pigments used in the ink composition useful in the invention may be present in any effective amount, generally from 0.1 to 10% by weight, and preferably from 0.5 to 6% by weight.

Inkjet ink compositions may also contain non-colored particles such as inorganic particles or polymeric particles. The use of such particulate addenda has increased over the past several years, especially in inkjet ink compositions intended for photographic-quality imaging. For example, U.S. Pat. No. 5,925,178 describes the use of inorganic particles in pigment-based inks in order to improve optical density and rub resistance of the pigment particles on the image-recording element. In another example, U.S. Pat. No. 6,508,548 describes the use of a water-dispersible polymeric latex in dye-based inks in order to improve light and ozone resistance of the printed images.

The ink composition may contain non-colored particles such as inorganic or polymeric particles in order to improve gloss differential, light and/or ozone resistance, waterfastness, rub resistance, and various other properties of a printed image; see for example, U.S. Pat. No. 6,598,967 or U.S. Pat. No. 6,508,548. Colorless ink compositions that contain non-colored particles and no colorant may also be used. For example US Patent Publication No. 2006/0100307 describes an inkjet ink comprising an aqueous medium and microgel particles. Colorless ink compositions are often used in the art as "fixers" or insolubilizing fluids that are printed under, over, or with colored ink compositions in order to reduce bleed between colors and water-fastness on plain paper; see for example, U.S. Pat. Nos. 5,866,638 or 6,450,632. Colorless inks are also used to provide an overcoat to a printed image, usually in order to improve scratch resistance and waterfastness; see for example, US Patent Publication No. 2002/0009547 or EP Patent Publication No. 1,022,151. Colorless inks are also used to reduce gloss differential in a printed image; see for example, U.S. Pat. No. 6,604,819 or US Patent Publication Numbers 2003/0085974, 2003/0193553, or 2003/0189626.

Examples of inorganic particles useful in inks used in the invention include, but are not limited to, alumina, boehmite, clay, calcium carbonate, titanium dioxide, calcined clay, aluminosilicates, silica, or barium sulfate.

For aqueous-based inks, polymeric binders useful in the invention include water-dispersible polymers generally classified as either addition polymers or condensation polymers, both of which are well-known to those skilled in the art of polymer chemistry. Examples of polymer classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric, film-forming, non-film-forming, fusible, or heavily cross-linked and can have a wide range of molecular weights and glass transition temperatures.

Examples of useful polymeric binders include styrene-acrylic copolymers sold under the trade names JONCRYL® (S.C. Johnson Co.), UCAR™ (Dow Chemical Co.), JONREZ® (MeadWestvaco Corp.), and VANCRYL® (Air Products and Chemicals, Inc.); sulfonated polyesters sold under the trade name EASTMAN AQ™ (Eastman Chemical Co.); and polyethylene or polypropylene resin emulsions and polyurethanes (such as the WITCOBONDS™ from Witco). These polymers are preferred because they are compatible in typical aqueous-based ink compositions, and because they render printed images that are highly durable towards physical abrasion, light, and ozone.

The non-colored particles and binders useful in the ink composition used in the invention may be present in any effective amount, generally from 0.01 to 20% by weight, and preferably from 0.01 to 6% by weight. The exact choice of materials will depend upon the specific application and performance requirements of the printed image.

Ink compositions may also contain water-soluble polymer binders. The water-soluble polymers useful in the ink composition are differentiated from polymer particles in that they are soluble in the water phase or combined water/water-soluble solvent phase of the ink. The term "water-soluble" herein means that when the polymer is dissolved in water and when the polymer is at least partially neutralized the resultant solution is visually clear. Included in this class of polymers are nonionic, anionic, amphoteric, and cationic polymers. Representative examples of water soluble polymers include polyvinyl alcohols, polyvinyl acetates, polyvinyl pyrrolidones, carboxy methyl cellulose, polyethyloxazolines, polyethyleneimines, polyamides and alkali soluble resins, polyurethanes (such as those found in U.S. Pat. No. 6,268,101), polyacrylic type polymers such as polyacrylic acid and styrene-acrylic methacrylic acid copolymers (such as JONCRYL® 70 from S.C. Johnson Co., TRUDOT™ IJ-4655 from MeadWestvaco Corp., and VANCRYL® 68S from Air Products and Chemicals, Inc.).

Examples of water-soluble acrylic type polymeric additives and water dispersible polycarbonate-type or polyether-type polyurethanes which may be used in the inks of the ink sets useful in the invention are described in copending, commonly assigned U.S. patent application Ser. Nos. 12/029,929 and 12/029,972, the disclosures of which are incorporated by reference herein. Polymeric binder additives useful in the inks used in the invention are also described in, for example, US Patent Publication Numbers 2006/0100307 and 2006/0100308.

In practice, ink static and dynamic surface tensions are controlled so that inks of an ink set can provide prints with the desired inter-color bleed. In particular, it has been found that the dynamic surface tension at 10 milliseconds surface age for all inks of the ink set comprising cyan, magenta, yellow, and black pigment-based inks and a colorless protective ink should be greater than or equal to 35 mN/m, while the static surface tensions of the yellow ink and of the colorless protective ink should be at least 2.0 mN/m lower than the static surface tensions of the cyan, magenta, and black inks of the ink set, and the static surface tension of the colorless protective ink should be at least 1.0 mN/m lower than the static surface tension of the yellow ink in order to provide acceptable performance for inter-color bleed on both microporous photoglossy and plain paper. It is generally preferred that the static surface tension of the yellow ink is at least 2.0 mN/m lower than all other inks of the ink set excluding the clear protective ink, and the static surface tension of the clear protective ink is at least 2.0 mN/m lower than all other inks of the ink set excluding the yellow ink.

Surfactants may be added to adjust the surface tension of the inks to appropriate levels. The surfactants may be anionic, cationic, amphoteric, or nonionic and used at levels of 0.01 to 5% of the ink composition. Examples of suitable nonionic surfactants include linear or secondary alcohol ethoxylates (such as the TERGITOL™ 15-S and TERGITOL™ TMN series available from Union Carbide and the BRIJ® series from Uniquema), ethoxylated alkyl phenols (such as the TRITON™ series from Union Carbide), fluoro surfactants (such as the ZONYLS® from DuPont and the FLUORADS™ from 3M), fatty acid ethoxylates, fatty amide ethoxylates, ethoxylated and propoxylated block copolymers (such as the PLURONIC® and TETRONIC® series from BASF), ethoxylated and propoxylated silicone based surfactants (such as the SILWET™ series from CK Witco), alkyl polyglycosides (such as the GLUCOPONS® from Cognis), and acetylenic polyethylene oxide surfactants (such as the SURFYNOLS® from Air Products and Chemicals, Inc.).

Examples of anionic surfactants include: carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates, and alkyl naphthalene sulfonates), phosphated (such as phosphated esters of alkyl and aryl alcohols, including the STRODEX™ series from Dexter Chemical), phosphonated and amine oxide surfactants, and anionic fluorinated surfactants. Examples of amphoteric surfactants include: betaines, sultaines, and aminopropionates. Examples of cationic surfactants include: quaternary ammonium compounds, cationic amine oxides, ethoxylated fatty amines, and imidazoline surfactants. Additional examples of the above surfactants are described in "McCutcheon's Emulsifiers and Detergents," 2003, North American Edition.

A biocide may be added to an inkjet ink composition to suppress the growth of micro-organisms such as molds, fungi, etc. in aqueous inks. A preferred biocide for an ink composition is PROXEL™ GXL (Avecia Specialties) at a final concentration of 0.0001-0.5 wt. %. Additional additives which may optionally be present in an inkjet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers, and defoamers.

The pH of the aqueous ink compositions useful in the invention may be adjusted by the addition of organic or inorganic acids or bases. Useful inks may have a preferred pH of from about 2 to 10, depending upon the type of dye or pigment being used. Typical inorganic acids include hydrochloric, phosphoric, and sulfuric acids. Typical organic acids include methanesulfonic, acetic, and lactic acids. Typical inorganic bases include alkali metal hydroxides and carbonates. Typical organic bases include ammonia, triethanolamine, and tetramethylethlenediamine.

The exact choice of ink components will depend upon the specific application and performance requirements of the printhead from which they are jetted. Thermal and piezoelectric drop-on-demand printheads and continuous printheads each require ink compositions with a different set of physical properties in order to achieve reliable and accurate jetting of the ink, as is well known in the art of inkjet printing. Acceptable viscosities are no greater than 20 cP, and preferably in the range of about 1.0 to 6.0 cP.

For color inkjet printing, a minimum of cyan, magenta, and yellow inks are required for an inkjet ink set which is intended to function as a subtractive color system. Very often black ink is added to the ink set to decrease the ink required to render dark areas in an image and for printing of black and white documents such as text. The need to print on both microporous photoglossy and plain paper receivers may be met by providing a plurality of black inks in an ink set. In this case, one of the black inks may be better suited to printing on microporous photoglossy receivers while another black ink may be better suited to printing on plain paper. Use of separate black ink formulations for this purpose can be justified based on desired print densities, printed gloss, and smudge resistance for the type of receiver.

Other inks can be added to the ink set. These inks include light or dilute cyan, light or dilute magenta, light or dilute black, red, blue, green, orange, gray, and the like. Additional inks can be beneficial for image quality but they add system complexity and cost. Finally, colorless ink composition can be added to the inkjet ink set for the purpose of providing gloss uniformity, durability and stain resistance to areas in the printed image which receive little or no ink otherwise. Even for image areas printed with a significant level of colorant containing inks, the colorless ink composition can be added to those areas with further benefits. An example of a protective ink for the above purposes is described in US Patent Publication Numbers 2006/0100306 and 2006/0100308.

FIG. 1 shows one schematic example of an inkjet printer 10 that includes a protective cover 40 for the internal components of the printer. The printer contains a media supply 20 in a tray. The printer includes one or more ink tanks 18 (shown here as having four inks) that supply ink to a printhead 30. The printhead 30 and ink tanks 18 are mounted on a carriage 100. The printer includes a source of image data 12 that provides signals that are interpreted by a controller (not shown) as being commands to eject drops of ink from the printhead 30. Printheads may be integral with the ink tanks or separate. Exemplary printheads are described in U.S. Pat. No. 7,350,902. In a typical printing operation a media sheet travels from the recording medium supply 20 in a media supply tray to a region where the printhead 30 deposits droplets of ink onto the media sheet. The printed media collection 22 is accumulated in an output tray.

Figure 2:
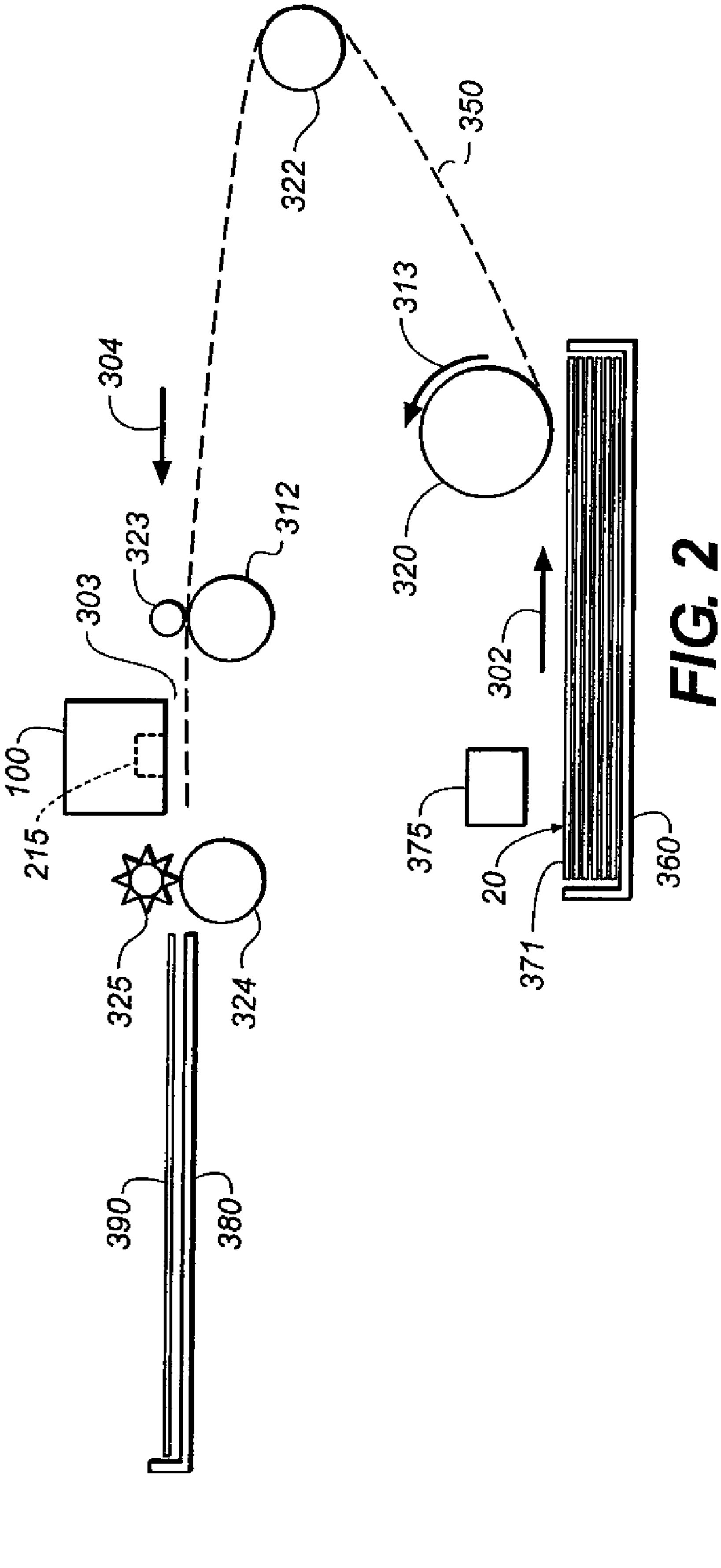
FIG. 2 is a schematic diagram showing the flow of recording element or media from the supply tray to the collection tray.

FIG. 2 shows schematically how the inkjet printer comprises a variety of rollers to advance the media sheet, for example paper, through the printer, as shown schematically in the side view of FIG. 2. In this example, a pickup roller 320 moves the top media sheet 371 of a recording medium supply 20 that is located in a media supply tray 360 in the direction of arrow 302. A turn roller 322 acts to move the media sheet 371 around a C-shaped path 350 (in cooperation with a curved surface—not shown) so that the media sheet continues to advance along direction arrow 304 in the printer. The media sheet 371 is then moved by feed roller 312 and idler roller(s) 323 to advance along direction 304 across the print region 303 and under printer carriage 100. A discharge roller 324 and star wheel(s) 325 transport the printed media sheet 390 along direction 304 and to an output tray 380. For normal media pick-up and feeding, it is desired that all driven rollers rotate in forward direction 313. An optional sensor 215 capable of detecting properties of the media sheet or indicia contained thereon can be mounted on the carriage 100. A further optional sensor 375 capable of detecting properties of the media sheet or indicia contained thereon may be positioned facing the front or back surface of the media sheet 371 and located at any advantageous position along the media transport path 350 including the media supply tray 360. Alternatively, the inkjet printing system comprises a printer supplied with a continuous roll of ink recording medium that may be cut to individual prints subsequent to printing.

Different types of image-recording elements (media) vary widely in their ability to absorb ink. Inkjet printing systems provide a number of different print modes designed for specific media types. A print mode is a set of rules for determining the amount placement, and timing of the jetting of ink droplets during the printing operation. For optimal image reproduction in inkjet printing, the printing system must match the supplied media type with the correct print mode. The printing system may rely on the user interface to receive the identity of the supplied media, or an automated media detection system may be employed. A media detection system comprises a media detector, signal conditioning procedures, and an algorithm or took-up table to decide the media identity. The media detector may be configured to sense indicia present on the media comprising logos, patterns, and the like corresponding to media type, or may be configured to detect inherent media properties, typically optical reflection. The media detector may be located in a position to view either the front or back of the media sheet, depending on the property being detected. As exemplified in FIG. 2, the media detector 375 may be located to view the media sheet 371 in the media supply tray 360 or along the media transport path 350. Alternatively, optical sensor 215 may be located at the print region 303. Usefully, the media comprise a repeating pattern detectable by the method described in U.S. Pat. No. 7,120,272. Alternatively, a number of media detection methods are described in U.S. Pat. No. 6,585,341.

Embodiments of the inkjet recording element of the invention may provide, among other attributes, improved color density, gloss, ink capacity, image permanence, adhesion to the support or underlying layers, and water-fastness. In addition, the element may provide improved resistance to banding, differential gloss, coalescence, bleed, fade due to light, heat, or exposures to atmospheric gases, for example ozone, high humidity bleeding, abrasion, cracking, flaking, and yellowing.

EXAMPLES

Fusible Polymer Particle Preparation

A reactive poly(butyl methacrylate-co-ethylmethacrylate-co-glydicyl methacrylate-co-methacrylic acid) particle was prepared according to the following procedure.

Header Flask: A mixture of 120 g of deionized, degassed water, 39.0 g of butyl methacrylate, 17.4 g ethyl methacrylate, 5.4 grams of glycidyl methacrylate, 3.3 grams of methacrylic acid, and 0.75 g of mercaptopropionic acid were placed in a header flask. Then 0.8 g of potassium persulfate was added and the mixture was stirred and purged with nitrogen. Then 0.25 g of sodium dodecyl sulfate was added to the flask.

Reactor: A one-liter, three-necked, round-bottom flask fitted with a mechanical stirrer, reflux condenser, and nitrogen inlet was charged with 100 g of deionized, degassed water and sparged with nitrogen. The flask was placed in a 35° C. water bath under a slight positive pressure of nitrogen and stirring was begun. Then 0.15 g of potassium persulfate and 0.9 g of sodium metabisulfite were added to the water.

The contents of the header flask were pumped into the reactor over 2 hours. The reaction mixture was heated at 35° C. for 30 minutes following the end of the addition of the header contents. The reaction mixture was cooled to room temperature and filtered. The resulting particle size diameter of the fusible reactive polymer particles was 510 nm and the monodispersity index of the polymer particle distribution was 1.03. The weight-average molecular weight of the polymer was 97,000 daltons.

Preparation of Image Recording Elements

A model coating structure was used to prepare inkjet image recording elements containing a layer of fusible polymer particles as prepared above. The support for the recording element was a plain paper onto which a porous sump layer was coated having a dry thickness of about 25 micrometers. The sump layer comprised a mixture of hollow polymeric beads HS 3000NA™ (Dow Chemical), talc, polyvinylalcohol GH17™ (Nippon Gohsei) and ammonium zirconium carbonate in a ratio of 64/27/8/1 by weight. A fusible polymer particle layer was then coated onto the sump layer at a wet laydown of 6456 mg/m$^2$. The coating solution consisted of a 16% solids mixture of fusible beads as prepared above, a modified styrene-butadiene latex binder (CP 692 NA™ Dow Chemicals) and a wetting agent. PLURONIC® P103 is an EO/PO block copolymer that has about 30 wt % EO groups and a molecular weight of 4950 Daltons and an HLB of 7-12. TETRONIC® T904 has 40 wt % EO groups, a molecular weight of 6700, and an HLB of 12-18. The weight ratio of fusible polymer particles to SB 692 NA latex to wetting agent was 94/4/2 unless otherwise specified. The resulting dry thickness of the fusible polymer particle layer comprising binder and wetting agent was about 6 microns. Additional image recording elements were prepared with different types and/or ratios of polymer particles to wetting agent. The resulting image recording elements are summarized in Table 2.

TABLE 2

Examples of Inkjet Image Recording Elements Containing Fusible Polymer Particle Layers.

| Element ID | Wetting Agent | EO/PO Block Polymer | Draves Coefficient 0.1% at 25° C. | Weight Ratio Block Polymer to particles |
|---|---|---|---|---|
| Inventive 1 | PLURONIC ® P103 | yes | 17 | 98.5/1.5 |
| Inventive 2 | PLURONIC ® P103 | yes | 17 | 97/3 |

TABLE 2-continued

Examples of Inkjet Image Recording Elements Containing Fusible Polymer Particle Layers.

| Element ID | Wetting Agent | EO/PO Block Polymer | Draves Coefficient 0.1% at 25° C. | Weight Ratio Block Polymer to particles |
|---|---|---|---|---|
| Inventive 3 | PLURONIC ® P103 | yes | 17 | 94/6 |
| Inventive 4 | TETRONIC ® 904 | yes | 88 | 98.5/1.5 |
| Inventive 5 | TETRONIC ® 904 | yes | 88 | 97/3 |
| Inventive 6 | TETRONIC ® 904 | yes | 88 | 94.5/5.5 |
| Inventive 7 | TETRONIC ® 904 | yes | 88 | 90/10 |
| Comparative 1 | PLURONIC ® F98 | yes | >360 | 99/1 |
| Comparative 2 | PLURONIC ® F98 | yes | >360 | 90/10 |
| Comparative 3 | TETRONIC ® 1307 | yes | >360 | 99/1 |
| Comparative 4 | TETRONIC ® 1307 | yes | >360 | 90/10 |
| Comparative 5 | TETRONIC ® 304 | yes | >360 | 98/2 |
| Comparative 6 | PLURONIC ® 17R4 | yes | >360 | 98/2 |
| Comparative 7 | PLURONIC ® L-44 | yes | >360 | 98/2 |
| Comparative 8 | APG 625$_{a*}$ | no | yes | 90/10 |
| Comparative 9 | ZONYL ® FSN$_{b*}$ | no | unknown | 90/10 |
| Comparative 10 | TWEEN ® 80$_{c*}$ | no | unknown | 98/2 |
| Comparative 11 | TERGITOL ™ TMN-6$_{d*}$ | no | yes | 98/2 |

Note:

$_{a*}$, $_{b*}$, $_{c*}$ and $_{d*}$ are not ethylene oxide-propylene oxide block copolymers $_{a*}$is an alkyl polyglycoside having a Draves coefficient of 23 seconds $_{b*}$is an ethoxylated fluorosurfactant $_{c*}$is a sorbitan monoleate $_{d*}$is an ethoxylated alcohol having a Draves coefficient of 3 seconds Printing and Evaluation Image recording elements Inventive-1 through Inventive-7 and Comparative-1 through Comparative-11 were loaded into a Kodak Easy share Series 5000 All-in-One Printer equipped with pigment-based inks. A target image was printed onto each recording element consisting of pure cyan, magenta, yellow, and black, and secondary colors red, blue, and green in a series of color patches The patches corresponded to ink laydowns ranging from 10% coverage up to 400% coverage in increments of 10%. Each of the patches was separated in the target by a thin section of non-imaged area so that characteristics such as bleed could be evaluated. Additional areas of the target included solid patches of cyan, magenta, yellow, red, green, and blue printed directly adjacent to one another without non-imaged area between the patches. The resulting printed images were allowed to dry for one hour and then were fused in a heated nip at between 120 and 180° C. and 4.2 kg/cm$^2$ of pressure against as sol-gel coated polyimide belt at 76 cm/min.

The printed and fused images were evaluated for the following image quality performance characteristics:

Coalescence

The printed images were evaluated visually for coalescence or puddling of ink in the image element surface of the solid patches of color and the degree of coalescence was rated on a scale of 1 to 4. A value of 4 indicates severe coalescence of ink and a value of 1 indicated no observable coalescence. A rating of 2 or less was deemed to be a level of coalescence that would be acceptable for a typical consumer photographic image.

Bleed

The printed images were evaluated by examining color patches of different color or density situated adjacent to one another on the printed target and the degree of bleed was rated on a scale of 1 to 4. A value of 4 indicates severe bleed of ink from one color patch into another patch and a value of 1 indicated no observable bleed even into the non-image area between the color patches. A rating of 2 or less was deemed to be a level of bleed that would be acceptable for a typical consumer photographic image.

Water and Stain Resistance

Each of the fused prints was subjected to a physical durability test involving the resistance of the print to liquids. The test consisted of placing a 3 ml volume of liquid on the non-imaged surface of the fused print and allowing the liquid to sit for 10 minutes. After this time period the liquid was removed with a paper towel and the print was examined for any residual stain or surface distortion on the print. Three liquids were used for the test: water, coffee, and fruit punch (Hawaiian Punch®, which contains Red Dye #40 and Blue Dye #1). If no observable stain or distortion was evident the print was scored as a "none" and if a liquid resulted in a stain or distortion is was given a "w" for water, a "c" for coffee and a "p" for fruit punch.

Cracking

Each of the fused prints was subjected to a physical durability test involving the cracking resistance of the print to a physical bending of the print. This test involved wrapping a section of the printed fused target around a one-inch mandrel.

The printed target was then unwound and the surface of the prints was then examined for the presence of cracks. Cracking was rated on a scale of 1 to 3 with a three representing cracks that were easily visible to the naked eye and a 1 representing no visible cracks.

Deglossing

The 20-degree gloss of each fused print was measured shortly after printing and recorded. An accelerated degloss test was run whereby the fused print was incubated at 70° C. and 50% relative humidity for 24 hours. The 20-degree gloss was again recorded. Lower values for gloss remaining indicate an undesirable loss of gloss in the fused print.

A summary of the image quality performance of the fused prints is shown in Table 3 for each of the characteristics described above.

TABLE 3

Image Permanence Performance for Fused Images.

| Recording Element | Stain Resistance | Cracking Resistance | Gloss Remaining | Bleed | Coalescence |
|---|---|---|---|---|---|
| Inventive-1 | none | 3 | 40.4 | 2 | 2 |
| Inventive-2 | none | 1 | 41.3 | 1 | 1 |
| Inventive-3 | none | 1 | 41.1 | 1 | 1 |
| Inventive-4 | none | 1 | 41.1 | 2 | 2 |
| Inventive-5 | none | 1 | 45.6 | 1 | 1 |
| Inventive-6 | none | 2 | 43.1 | 1 | 1 |
| Inventive-7 | none | 1 | 42.6 | 1 | 1 |
| Comparative-1 | c, w, p | 1 | 38.6 | 3 | 2 |
| Comparative-2 | c, w, p | 1 | 34.0 | 3 | 2 |
| Comparative-3 | c, w, p | 2 | 20.9 | 3 | 3 |
| Comparative-4 | c, w, p | 1 | 28.3 | 3 | 2 |
| Comparative-5 | p | 3 | 37.0 | 3 | 3 |
| Comparative-6 | c, w, p | 3 | 40.1 | 3 | 3 |
| Comparative-7 | none | 3 | 41.0 | 3 | 3 |
| Comparative-8 | c, w, p | 3 | 35.0 | 3 | 3 |
| Comparative-9 | c, w, p | 3 | 44.0 | 3 | 3 |
| Comparative-10 | none | 3 | 49.8 | 3 | 3 |
| Comparative-11 | none | 3 | 41.0 | 4 | 4 |

Comparative example 11 in Table 3 shows that a typical image recording element having a fusible polymer particle layer is susceptible to performance limitations, especially with respect to bleed and coalescence when ink drops are applied to the surfaces thereof by an inkjet printer and to cracking of the fused polymer layer. The presence of wetting agents not including an ethylene oxide-propylene oxide copolymer (comparative examples 8 through 10) appears to only slightly improve the bleed and coalescence performance during ink deposition. However, stain resistance, deglossing, and/or cracking resistance are compromised. The presence of ethylene oxide-propylene oxide block copolymers having Draves coefficients greater than 360 seconds (comparative examples 1 through 7) also compromise one or more of the image quality attributes of the fused prints and only slightly improve bleed and coalescence.

Table 3 clearly shows that the presence of ethylene oxide-propylene oxide block copolymer wetting agents having Draves coefficients no greater than 360 seconds, in the fusible polymer particle layers of the image recording elements of the present invention, greatly improves the image quality of the resulting fused prints. Coalescence, bleed, and cracking are greatly reduced while stain resistance and gloss are maintained compared to recording elements not containing wetting agents in the fusible polymer particle layer.

The invention has been described in detail with particular reference to certain preferred embodiments thereof, but it will be understood that variations and modifications can be effected within the spirit and scope of the invention. The entire content of the patents and publications referred to in this document are incorporated herein by reference.

PARTS LIST

| | |
|---|---|
| 10 | inkjet printer |
| 12 | image data source |
| 18 | ink tanks |
| 20 | recording medium supply |
| 22 | printed media collection |
| 30 | printhead |
| 40 | protective cover |
| 100 | carriage |
| 215 | optical sensor |
| 302 | media direction |
| 303 | print region |
| 304 | media direction |
| 312 | feed roller |
| 313 | forward direction |
| 320 | pickup roller(s) |
| 322 | turn roller(s) |
| 323 | idler roller(s) |
| 324 | discharge roller(s) |
| 325 | star wheel(s) |
| 350 | media transport path |
| 360 | media supply tray |
| 371 | media sheet |
| 375 | further optical sensor |
| 380 | media output tray |
| 390 | printed media sheet |

The invention claimed is:

1. An inkjet printing system that contains an inkjet printer loaded with a recording element comprising a support and a porous ink receiving layer containing:

a) fusible polymeric particles; and b) a water soluble block copolymer having ethylene oxide and propylene oxide segments, the copolymer exhibiting a Draves wetting coefficient, for a 0.1 wt % solution in water at 25° C., of not more than 360 seconds.

2. The inkjet printer system of claim 1, wherein the copolymer has a Draves wetting coefficient of less than 200.

3. The inkjet recording element of claim 2, wherein the copolymer has a Draves wetting coefficient of less than 100.

4. The inkjet printer system of claim 1, wherein the copolymer has an HLB value from 7 to 24.

5. The inkjet printer system of claim 4, wherein the copolymer has an HLB value of from 12 to 18.

6. The inkjet printer system of claim 1, wherein the ink receiving layer further comprises a polymer binder.

7. The inkjet printer system of claim 6, wherein the polymer binder is a condensation polymer or a styrene-butadiene polymer.

8. The inkjet printer system of claim 1, wherein the fusible polymeric particles comprise a polymer selected from the group consisting of a condensation polymer, a styrenic polymer, a vinyl polymer, an ethylene-vinyl chloride copolymer, a polyacrylate polymer, a poly(vinyl acetate), a poly(vinylidene chloride), a vinyl acetate-vinyl chloride copolymer, and a cellulose acetate ester polymer.

9. The inkjet printer system of claim 1, wherein the fusible polymeric particles have a glass transition temperature of greater than 20° C.

10. The inkjet printer system of claim 1, wherein the fusible polymeric particles comprise functional groups that are reactive with one another during the fusing step.

11. The inkjet printer system of claim 1, wherein the fusible polymeric particles have a weight average diameter ranging from 0.05 to 5 micrometers.

12. The inkjet printer system of claim 1, wherein the ethylene oxide-propylene oxide copolymer is present in the ink receiving layer at 0.5 to 10% of the weight of the fusible polymeric particles.

13. The inkjet printer system of claim 1, wherein the ink receiving layer has a dry coated thickness of from 1 micron to 50 microns.

14. The inkjet printer system of claim 1, further comprising a second porous layer disposed between the ink receiving layer and the support.

15. The inkjet printer system of claim 14, wherein the second porous layer comprises hollow polymer particles.

16. The inkjet printer system of claim 1, further comprising a second layer disposed between the ink receiving layer and the support, the second layer comprising fusible polymeric particles and a mordant.

17. An inkjet recording medium comprising a support and a porous layer containing:

a) fusible polymeric particles; and b) a water soluble block copolymer having ethylene oxide and propylene oxide segments, the copolymer exhibiting a Draves wetting coefficient for a 0.1 wt % solution in water at 25° C. of not more than 360 seconds.

18. A method for printing an inkjet image comprising:

I) providing an aqueous inkjet ink;

II) providing an inkjet recording element comprising a support and a fusible porous layer containing:

a) fusible polymeric particles; and b) a water soluble block copolymer having ethylene oxide and propylene oxide segments, the copolymer exhibiting a Draves wetting coefficient for a 0.1 wt % solution in water at 25° C. of not more than 360 seconds;

III) jetting the inkjet ink in the form of ink drops onto the fusible layer to form a printed image; and IV) fusing the printed inkjet recording element.

* * * * *